United States Patent
Lee et al.

(10) Patent No.: US 9,696,410 B1
(45) Date of Patent: Jul. 4, 2017

(54) JAMMING SUPPRESSION APPARATUS AND METHOD OF ALTITUDE MEASURING SENSOR

(71) Applicant: AGENCY FOR DEFENSE DEVELOPMENT, Daejeon (KR)

(72) Inventors: Jaehwan Lee, Sejong (KR); Jonghun Jang, Daejeon (KR); Jaehyun Choi, Daejeon (KR); Jineep Roh, Sejong (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 0 days.

(21) Appl. No.: 15/193,636

(22) Filed: Jun. 27, 2016

(30) Foreign Application Priority Data

Apr. 26, 2016 (KR) .................. 10-2016-0051012

(51) Int. Cl.
  *G01S 19/21* (2010.01)
  *G01S 7/36* (2006.01)
  *G01S 13/88* (2006.01)

(52) U.S. Cl.
  CPC .............. *G01S 7/36* (2013.01); *G01S 13/882* (2013.01)

(58) Field of Classification Search
  CPC .................................. G01S 7/36; G01S 7/2813
  USPC ........................... 342/14, 16, 17, 357.59, 462
  See application file for complete search history.

(56) References Cited

U.S. PATENT DOCUMENTS

2002/0169578 A1* 11/2002 Yang .................. G01S 3/36
                                                    702/152

FOREIGN PATENT DOCUMENTS

| JP | 2008304219 A | 12/2008 |
|---|---|---|
| KR | 10-2011-0086630 A | 7/2011 |
| KR | 101289315 B1 | 7/2013 |
| KR | 20130113481 A | 10/2013 |
| KR | 10-1386636 B1 | 4/2014 |
| KR | 10-1443143 B1 | 9/2014 |
| KR | 101554635 B1 | 9/2015 |

OTHER PUBLICATIONS

Sep. 9, 2016 Notice of Allowance issued in corresponding Korean Patent Application No. 10-2016-0051012.
Jun. 28, 2016 Office Action issued in corresponding Korean Patent Application No. 10-2016-0051012.
Jae-Hwan Lee et al., "Jamming Detection and Suppression Algorithm for an FMCW Radar Altimeter," Journal of Korean Institute of Electromagnetic Engineering and Science, 27(2):14-155, Feb. 2016.

\* cited by examiner

*Primary Examiner* — Dao Phan
(74) *Attorney, Agent, or Firm* — Ostrolenk Faber LLP

(57) ABSTRACT

Provided are an apparatus for minimizing occurrence of an error in measuring an altitude, and a method thereof. A jamming suppression apparatus of an altitude measuring sensor includes a signal unit configured to transmit a radio frequency (RF) signal to the outside or receive an RF signal from the outside, and a processing unit configured to determine whether jamming has occurred on the basis of a noise signal received from the signal unit, and suppress jamming by performing at least one of a plurality of jamming suppression algorithms sequentially or simultaneously on the basis of a current altitude when jamming has occurred according to the determination result.

15 Claims, 3 Drawing Sheets

JAMMING SUPPRESSION APPARATUS AND METHOD OF ALTITUDE MEASURING SENSOR

CROSS-REFERENCE TO RELATED APPLICATION

Pursuant to 35 U.S.C. §119(a), this application claims the benefit of earlier filing date and right of priority to Korean Application No. 10-2016-0051012, filed on Apr. 26, 2016, the contents of which is incorporated by reference herein in its entirety.

BACKGROUND OF THE INVENTION

1. Field of the Invention

The present disclosure relates to an apparatus for minimizing occurrence of an error in measuring an altitude, and a method thereof.

2. Background of the Invention

In the event of combat, a flight vehicle measures an altitude of its own or an altitude of an external flight vehicle, for attack or defense. Here, the flight vehicle utilizes an altitude measuring sensor for altitude measurement. The altitude measuring sensor is equipment transmitting electromagnetic waves to the outside, receiving electromagnetic waves (e.g., a reflected wave reflected from the surface of the earth) from the outside (e.g., the surface of the earth, a target, etc.), and analyzing the electromagnetic waves transmitted to the outside or received from the outside to obtain various types of information regarding topography.

A device using radio frequency (RF) signals, like the altitude measuring sensor, may be affected by ambient RF signals generated on purpose or nonintentionally. Here, since electromagnetic waves of the altitude measuring sensor are interfered with by ambient RF signals, an error may occur in measuring an altitude. A phenomenon in which a signal system (or a communication system) creates confusion or is interfered due to radio interference or radio disturbance is called a jamming phenomenon.

Due to the jamming phenomenon, the altitude measuring sensor generates a frequency signal with strong power by ambient RF signals in an operating frequency band operated in measuring an altitude over ambient RF signals, and the frequency signal with strong power causes an error in measuring an altitude, and thus, the altitude measuring sensor may not properly exhibit performance thereof.

In general, in order for the altitude measuring sensor to avoid such a jamming phenomenon, a frequency hopping scheme is commonly used. The frequency hopping scheme is a scheme to avoid jamming by changing a frequency when the jamming phenomenon occurs.

However, the frequency hopping scheme may appropriately avoid jamming when there is an extra band to which frequency is to be hopped, but if such an extra band for frequency hopping is limited, a frequency band to hop overlaps a frequency band in which jamming occurs, resulting in failure of jamming avoidance.

SUMMARY OF THE INVENTION

Therefore, an aspect of the detailed description is to provide an altitude measurement apparatus having enhanced accuracy and efficiency of jamming suppression and a method thereof.

Another aspect of the detailed description is to provide an active jamming suppression algorithm.

To achieve these and other advantages and in accordance with the purpose of this specification, as embodied and broadly described herein, a jamming suppression apparatus of an altitude measuring sensor includes: a signal unit configured to transmit a radio frequency (RF) signal to the outside or receive an RF signal from the outside; and a processing unit configured to determine whether jamming has occurred on the basis of a noise signal received from the signal unit, and suppress jamming by performing at least one of a plurality of jamming suppression algorithms sequentially or simultaneously on the basis of a current altitude when jamming has occurred according to the determination result.

In an embodiment, the processing unit may determine a tracking parameter related to the signal unit on the basis of the current altitude detected by the altitude measuring sensor, control the signal unit on the basis of the determined tracking parameter, and subsequently receive a noise signal from the signal unit.

In an embodiment, the signal unit may sample the noise signal received from the signal unit to detect the number of points exceeding a preset threshold value in a time domain, and when the detected number of points is equal to or greater than a preset number, the processing unit may determine that jamming has occurred.

In an embodiment, the processing unit may detect a specific altitude section to which the current altitude belongs from a plurality of preset altitude sections, and perform at least one jamming suppression algorithm matched to the specific altitude section.

In an embodiment, after the jamming suppression algorithm is performed, the processing unit may receive a noise signal again from the signal unit and determine whether jamming has occurred on the basis of the re-received noise signal, and when jamming has not occurred according to the determination result, the processing unit may control the signal unit to track an altitude.

In an embodiment, the jamming suppression apparatus may further include: an output unit configured to output an altitude, wherein, after the jamming suppression algorithm is performed, the processing unit may determine validity of the altitude tracked through the signal unit, and when the tracked altitude is valid according to the determination result, the processing unit may output the tracked altitude to the output unit.

In an embodiment, when the tracked altitude is not valid according to the determination result, the processing unit may detect a current altitude again using the signal unit.

In an embodiment, the processing unit may measure altitudes at least two times during a frequency modulation period of the altitude measuring sensor, and determine validity of the tracked altitudes using an average value of the tracked altitudes.

In an embodiment, the plurality of jamming suppression algorithms may include a first algorithm for performing jamming suppression through control in a time domain, a second algorithm for performing jamming suppression by controlling a transmission output and a reception gain value of the signal unit, and a third algorithm for performing jamming suppression using a frequency hop.

In an embodiment, the first algorithm may remove the jamming signal by substituting a corresponding value with 0 regarding a jamming signal occurrence section in the time domain.

To achieve these and other advantages and in accordance with the purpose of this specification, as embodied and broadly described herein, a jamming suppression method of an altitude measuring sensor includes: detecting an altitude; determining a tracking parameter related to a signal unit according to the detected altitude; receiving a noise signal from the outside through the signal unit controlled according to the determined tracking algorithm; determining whether jamming has occurred on the basis of the noise signal; when jamming has occurred according to the determination result, suppressing the jamming using at least one jamming suppression algorithm matched to the detected altitude, among a plurality of preset jamming suppression algorithms; and tracking an altitude after the jamming is suppressed.

In an embodiment, in the determining of whether jamming has occurred, the number of points exceeding a preset threshold value in a time domain may be detected by sampling the noise signal, and when the detected number of points is equal to or greater than a preset number, it may be determined that jamming has occurred.

In an embodiment, in the suppressing of jamming, a specific altitude section to which the detected altitude belongs may be detected from a plurality of preset altitude sections, and the at least one jamming suppression algorithm may be performed on the basis of the specific altitude section.

In an embodiment, the method may further include: after the at least one jamming suppression algorithm is performed, receiving a noise signal from the signal unit again to determine whether jamming has occurred; and when jamming has not occurred according to the determination result, tracking an altitude.

In an embodiment, the method may further include: after the at least one jamming suppression algorithm is performed, determining validity of the altitude tracked through the signal unit; and when the tracked altitude is valid according to the determination result, outputting the tracked altitude to an output unit.

In an embodiment, when the tracked altitude is not valid according to the determination result, a current altitude may be detected again using the signal unit.

In an embodiment, in the determining of whether the altitude is valid, altitudes may be measured at least twice during a frequency modulation period of the altitude measuring sensor, and validity of the tracked altitudes may be determined using an average of the measured altitudes.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An altitude measuring sensor refers to a device measuring an altitude using a radio frequency (RF) signal. Here, altitude measurement is a term including the meaning of both altitude detection to detect a current altitude by an altitude measuring sensor and altitude tracking to track a changing altitude by an altitude measuring sensor.

The altitude measuring sensor may measure an altitude using various RF signals. For example, the RF signals may be a frequency-modulated continuous-wave (FMCW).

Hereinafter, a jamming suppression method with respect to an altitude measuring sensor for measuring an altitude using an FMCW signal will be described for the purposes of description, but the present disclosure is not limited thereto and may be applied to any altitude measuring sensor using various RF signals.

In order to suppress a jamming phenomenon, the altitude measuring sensor may include a jamming suppression apparatus. The jamming suppression apparatus removes or restricts a jamming phenomenon to thus suppress the jamming phenomenon. Hereinafter, for the purposes of description, the jamming phenomenon will be termed as jamming, and removal or restriction of jamming will be termed as jamming suppression.

The jamming suppression apparatus is a component of the altitude measuring sensor. The jamming suppression apparatus may be configured as an internal apparatus of the altitude measuring sensor or may be configured as a separate external apparatus connected to the altitude measuring sensor wirelessly or wiredly.

Hereinafter, a configuration of the jamming suppression apparatus and a method for suppressing jamming that occurs in the altitude measuring sensor through the jamming suppression apparatus will be described with reference to the accompanying drawings.

Figure 1:
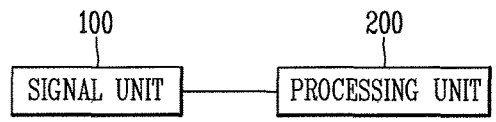
FIG. 1 is a block diagram illustrating a configuration of a jamming suppression apparatus according to an embodiment of the present disclosure.
Figure 2:
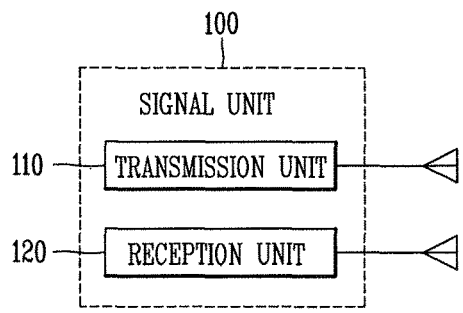
FIG. 2 is a block diagram illustrating a configuration of a signal unit of a jamming suppression apparatus according to an embodiment of the present disclosure.
Figure 3:
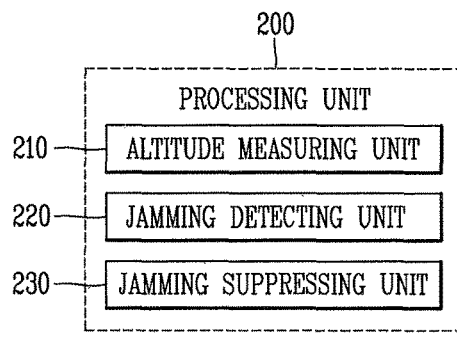
FIG. 3 is a block diagram illustrating a configuration of a processing unit of a jamming suppression apparatus according to an embodiment of the present disclosure.

FIG. 1 is a block diagram illustrating a configuration of a jamming suppression apparatus according to an embodiment of the present disclosure. FIG. 2 is a block diagram illustrating a configuration of a signal unit of a jamming suppression apparatus according to an embodiment of the present disclosure. FIG. 3 is a block diagram illustrating a configuration of a processing unit of a jamming suppression apparatus according to an embodiment of the present disclosure.

Referring to FIG. 1, the jamming suppression apparatus according to an embodiment of the present disclosure includes a signal unit 100 and a processing unit 200. Although not shown, the jamming suppression apparatus may further include: an output unit outputting an altitude.

The signal unit 100 may transmit and receive RF signals for measuring an altitude. In detail, referring to FIG. 2, the signal unit 100 includes a transmission unit transmitting RF signals to the outside and a reception unit 120 receiving RF signals from the outside. Although not shown, the signal unit 100 may further include a signal generating unit generating RF signals.

The transmission unit 110 may transmit RF signals (specifically, FMCW) to the outside in order to measure an altitude. Here, the outside refers to an environment surrounding the jamming suppression apparatus, which may be the surface of the face of the earth, a surface of the sea, or a target.

The reception unit 120 may receive RF signals from the outside. For example, the reception unit 120 may receive a reflective wave formed as RF signals transmitted from the transmission unit 110 are reflected from the outside, or may received noise signals generated at a certain outside.

The signal unit 100 may control transmission and reception of RF signals by tracking parameters set for altitude measurement.

The tracking parameters may be parameters related to power control, transmission output control, reception gain control, and frequency band width control of the transmission unit or the reception unit. The power control refers to ON/OFF control of the transmission unit or the reception unit. The transmission output control refers to output control of an RF signal output from the transmission unit 110. The reception gain control refers to control of a reception gain of an RF signal received by the reception unit 120. The frequency band width control refers to control of changing a band width of an operating frequency.

The tracking parameters may be set by the processing unit 200. Hereinafter, a configuration of the processing unit 200 will be described in detail.

The processing unit 200 may include an altitude measuring unit 210, a jamming detecting unit 220, and a jamming suppressing unit 230.

The altitude measuring unit 210 may detect and track an altitude using RF signals transmitted to and received from the signal unit 100. Also, the altitude measuring unit 210 may analyze validity of the measured altitude. For example, the altitude measuring unit 210 may receive a reflected wave formed as RF signals transmitted through the transmission unit 110 are reflected from the outside, and detect and track an altitude and topography on the basis of the reflected wave.

The jamming detection unit 220 may detect jamming signals generated when measuring an altitude. The jamming signals refer to frequency signals generated on purpose or nonintentionally from the outside, in addition to the RF signals used for altitude measurement. The jamming signals may interfere with or disturb the RF signals for altitude measurement, causing a jamming phenomenon. A method for detecting jamming by the jamming detecting unit 220 will be described in detail with reference to FIG. 5.

The jamming suppressing unit 230 may suppress jamming signals generated when an altitude is measured through at least one of a plurality of jamming suppression algorithms, on the basis of a current altitude.

The plurality of jamming suppression algorithms may include various types of algorithms. For example, the jamming suppression algorithms may include a first algorithm for suppressing jamming in a time domain, a second algorithm for suppressing jamming by controlling a transmission output and a reception gain, and a third algorithm for suppressing jamming through frequency hop.

The first algorithm is an algorithm for suppressing jamming by substituting signal values corresponding to jamming signals with 0 (zero-padding) to thus remove the jamming signals, regarding a generation section of jamming signals detected by the jamming detecting unit 220.

The second algorithm may suppress jamming by increasing a transmission output of the transmission unit 110 by a preset magnitude and reducing a reception gain by a magnitude corresponding to the increased transmission output.

In detail, the second algorithm is an algorithm for suppressing jamming using correlation between a transmission output and a reception gain of an RF signal for altitude measurement and a jamming signal. When a transmission output if the jamming suppression apparatus is increased and a reception gain thereof is decreased, output strength of the RF signal for altitude measurement is increased by the increased transmission output of the jamming suppression apparatus and reception strength of the RF signal for altitude measurement is reduced by the decreased reception gain of the jamming suppression apparatus. However, as for the jamming signals, signal strength thereof is reduced due to a reduction in a reception gain, regardless of whether transmission outputs of the transmission unit 110 and the reception unit 120 are increased. Based on these features, the second algorithm may suppress jamming by reducing strength of the jamming signal, while maintaining signal strength of the RF signal for altitude measurement.

The third algorithm is an algorithm for performing jamming suppression by moving an operating frequency band of the transmission unit 110 to a higher/lower frequency band when a jamming signal is applied in the operating frequency band of the transmission unit 110.

The method for suppressing jamming by the jamming suppressing unit 230 will be described in more detail with reference to FIG. 6.

Meanwhile, although not shown, the output unit (not shown) may output the measured altitude in at least one of visual, audible, and tactile manners. The output unit may be included as a component of the altitude measuring sensor, rather than that of the jamming suppression apparatus, or may be included as a component of the jamming suppression apparatus.

The output unit may be a display unit visually outputting information, a speaker outputting information in an audible manner, or a main body having a haptic sensor outputting information in a tactile manner.

Also, the jamming suppression apparatus may further include a memory unit (not shown) storing various types of data required for driving the jamming suppression apparatus. The memory unit may also be provided as a component of the altitude measuring sensor or as a component of the jamming suppression apparatus, like the output unit.

So far, the configuration of the jamming suppression apparatus of the altitude measuring sensor according to an embodiment of the present disclosure has been described. Hereinafter, a method for suppressing jamming using the configuration of the jamming suppression apparatus of the altitude measuring sensor according to an embodiment of the present disclosure will be described in detail with reference to the accompanying drawings.

Figure 4:
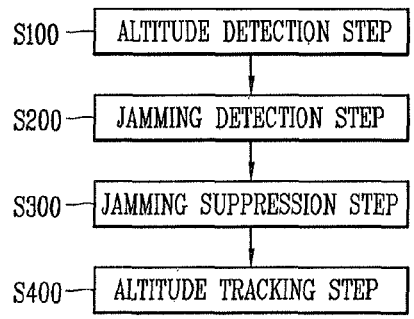
FIG. 4 is a flow chart illustrating a method for controlling a jamming suppression apparatus according to an embodiment of the present disclosure.
Figure 5:
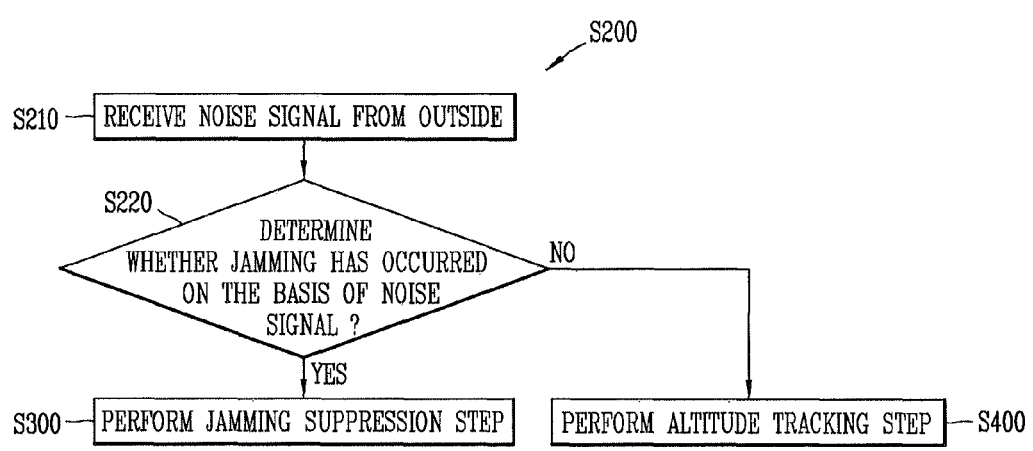
FIG. 5 is a flow chart illustrating a method for detecting jamming of a jamming suppression apparatus according to an embodiment of the present disclosure.

FIG. 4 is a flow chart illustrating a method for controlling a jamming suppression apparatus according to an embodiment of the present disclosure. FIG. 5 is a flow chart illustrating a method for detecting jamming of a jamming suppression apparatus according to an embodiment of the present disclosure. FIG. 6 is a flow chart illustrating a method for suppressing jamming of a jamming suppression apparatus according to an embodiment of the present disclosure. FIG. 7 is a flow chart illustrating a method for tracking an altitude of a jamming suppression apparatus according to an embodiment of the present disclosure.

Referring to FIG. 4, the jamming suppression apparatus according to an embodiment of the present disclosure may perform an altitude detection step (S100) of detecting an altitude.

The signal unit 100 of the jamming suppression apparatus may first perform jamming suppression before tracking an altitude. Accordingly, in an embodiment of the present disclosure, an altitude may be tracked in a state in which a jamming phenomenon is suppressed.

To this end, first, the signal unit 100 may detect a current altitude. In order to detect the current altitude, the signal unit may transmit and receive RF signals to and from the outside. Thereafter, the altitude measuring unit 210 may detect the current altitude on the basis of the transmitted and received RF signals.

Also, the altitude measuring unit 210 may determine tracking parameters corresponding to the detected current altitude. Thereafter, the altitude measuring unit 210 may control the signal unit 100 such that RF signals may be transmitted and received according to the determined tracking parameters.

The tracking parameters may have been previously matched according to altitudes. For example, first tracking parameters may have been matched to a first altitude, and second tracking parameters may have been matched to a second altitude. The matched values may be stored in a storing unit (not shown) of the jamming suppression apparatus in advance. Also, the tracking parameters may be set to have a specific value for a specific altitude according to a user setting.

Thereafter, the jamming suppression apparatus according to an embodiment of the present disclosure may perform a jamming detection step (S200) of detecting whether a jamming signal has been generated.

The jamming detecting unit 220 may detect whether a jamming signal has been generated, after the signal unit 100 is controlled according to tracking parameters.

Referring to FIG. 5, the jamming detecting unit 220 may receive a noise signal from the outside in order to detect whether a jamming signal has been generated (S210).

In order to receive the noise signal, the jamming detecting unit 220 may turn off power of the transmission unit 110 and receive an RF signal from the outside through the reception unit 120. That is, the noise signal refers to an RF signal received in a state in which power of the transmission unit is in an OFF state.

When the noise signal is received, the jamming detecting unit 220 may determine whether jamming has occurred on the basis of the noise signal (S220).

The jamming detecting unit 220 may determine whether jamming has occurred by analyzing the noise signal.

In detail, the jamming detecting unit 220 performs sampling on the noise signal through an analog-to-digital converter (ADC). Thereafter, the jamming detecting unit 220 may detect the number of points having a frequency exceeding a preset threshold value, among sampling data obtained by sampling the noise signal. The preset threshold value may be set in advance through an experiment or by a user.

When the number of the points is equal to or greater than a preset number (N number), the jamming detecting unit 220 may determine that jamming has occurred. In this case, the jamming suppression apparatus may perform a jamming suppression step (S300) by the jamming suppression unit 230.

Here, the preset number may be determined on the basis of accuracy and reliability of jamming suppression or may be determined by the user. For example, the preset number may have a smaller value as accuracy of jamming suppression is higher and may have a greater value as accuracy of jamming suppression is lower.

If, however, the number of the points is smaller than the preset number (N number), the jamming detecting unit 220 may determine that jamming has not occurred. In this case, the jamming suppression apparatus may perform an altitude tracking step (S400) through the altitude measuring unit 210. As illustrated in FIG. 4, when jamming occurs, the jamming suppression apparatus according to an embodiment of the present disclosure may perform jamming suppression step (S300).

When it is determined that jamming has occurred, the jamming suppressing unit 230 may suppress the generated jamming using a jamming suppression algorithm.

Figure 6:
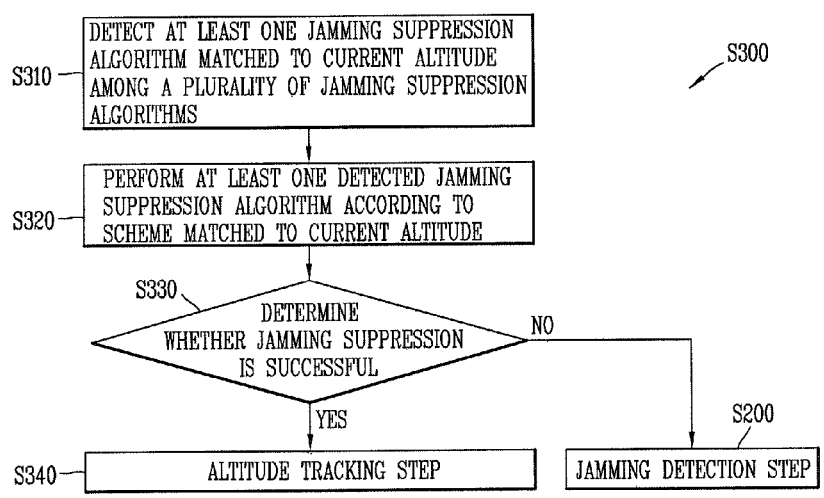
FIG. 6 is a flow chart illustrating a method for suppressing jamming of a jamming suppression apparatus according to an embodiment of the present disclosure.
Figure 7:
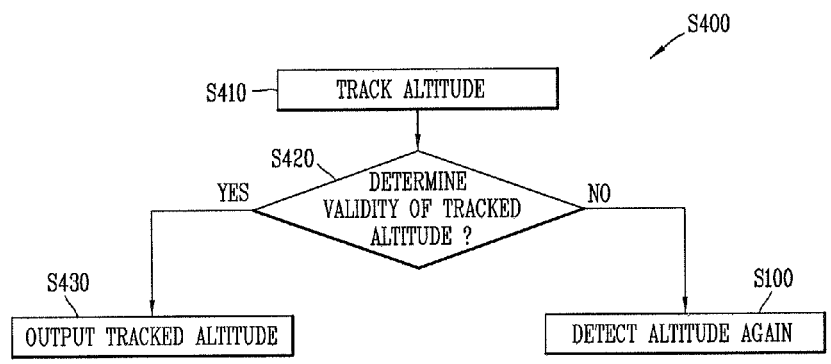
FIG. 7 is a flow chart illustrating a method for tracking an altitude of a jamming suppression apparatus according to an embodiment of the present disclosure.

In detail, referring to FIG. 6, THE jamming suppressing unit 230 may detect at least one jamming suppression algorithm corresponding to the current altitude from a plurality of jamming suppression algorithms (S310).

The jamming suppression apparatus according to an embodiment of the present disclosure may perform jamming suppression using different jamming suppression algorithms according to altitudes. To this end, different jamming suppression algorithms may be matched to different altitudes. Alternatively, a section of an altitude may be set, and a different jamming suppression algorithm may be matched to each section of algorithms.

Hereinafter, a case in which a specific algorithm is matched to a specific altitude will be described as a reference for the purposes of description, but the present disclosure may also be applied to a case in which a specific altitude algorithm is matched to a specific altitude section in the same manner. In a case in which jamming suppression algorithms are matched specific altitude sections, respectively, the jamming suppressing unit 230 may first detect an altitude section to which the current altitude belongs, and perform the following steps.

After the at least one jamming suppression algorithm is detected, the jamming suppressing unit 230 may perform jamming suppression by matching the at least one detected jamming suppression algorithm to the current altitude (S320). The jamming suppression apparatus according to an embodiment of the present disclosure may match at least one jamming suppression algorithm to a specific altitude in advance. In a case in which one jamming suppression algorithm has been matched to a specific altitude, the jamming suppressing unit 230 may perform jamming suppression on the basis of the one jamming suppression algorithm.

Meanwhile, a scheme for performing a jamming suppression algorithm may also be matched to the specific altitude together. That is, in a case in which at least two jamming suppression algorithms have been matched to the specific altitude, a scheme of performing the at least two jamming suppression algorithms simultaneously or sequentially in preset order may be matched to the specific altitude.

The performing scheme may be previously set in the jamming suppression apparatus.

For example, in a case in which a first algorithm and a second algorithm have been matched to the first altitude, the jamming suppressing unit 230 may perform the first algorithm and the second algorithm sequentially according to the preset order or simultaneously.

In another example, in a case in which the first algorithm and a third algorithm have been matched to the second altitude, the jamming suppressing unit 230 may perform the third algorithm and the first algorithm sequentially according to the preset order or may perform the first and third algorithms simultaneously In this manner, the jamming suppressing unit 230 according to an embodiment of the present disclosure may actively select an algorithm appropriate for jamming suppression according to altitudes of the altitude measuring sensor, whereby accuracy of jamming suppression may be enhanced.

After the jamming suppression algorithm is performed, the jamming suppressing unit 230 may determine whether jamming suppression is successful (S330).

After the jamming suppression algorithm matched to the specific altitude is performed, the jamming suppressing unit 230 may determine whether jamming has occurred again. To this end, after the jamming suppression algorithm is performed, the jamming suppressing unit 230 may control the signal unit 100 to receive a noise signal again, and analyze the re-received noise signal to determine whether jamming has occurred again.

When it is determined that jamming has occurred, the jamming suppressing unit 230 may perform the jamming detection step (S200) again. That is, the jamming suppressing unit 23Q may perform jamming suppression again.

If, however, jamming has not occurred, the jamming suppressing unit 230 may determine that jamming suppression was successful, and perform an altitude tracking step (S400). Hereinafter the altitude tracking step S400 will be described in detail.

Referring to FIG. 4, after performing the jamming suppression step (S300), the jamming suppression apparatus may perform the altitude tracking step (S400). In detail, as illustrated in FIG. 7, after the jamming suppression algorithm is performed, the altitude measuring unit 210 may track an altitude (S410).

After tracking an altitude, the altitude measuring unit 210 may determine validity of the tracked altitude (S420). Validity of the tracked altitude may be determined through various validity determination methods. For example, the altitude measuring unit 210 may measure two or more altitudes during a frequency modulation period of a radio frequency (RF) (for example, a triangular wave) measured by the altitude measuring sensor, calculate an average value of the measured altitude values, and compare the calculated average value with an altitude measured in a previous modulation period of the RF, to thus determine validity of the tracked altitude. Here, when a difference value between the average value and the altitude measured in the previous modulation period is equal to or greater than a preset value, the altitude measuring unit 210 may determine that the tracked altitude is not valid, and when the difference between the average value and the altitude measured in the previous modulation period is smaller than the preset value, the altitude measuring unit 210 may determine that the tracked altitude is valid.

When the tracked altitude is determined to be valid, the altitude measuring unit 210 may output the tracked altitude through the output unit (not shown) (S430).

The output unit may output the tracked altitude in at least one of visual, audible, and tactile manners. For example, the output unit may display the tracked altitude in a visual form.

Meanwhile, when it is determined that the tracked altitude is not valid, the altitude measuring unit 210 may perform the altitude detection step (S100) again. That is, when the tracked altitude is not valid, the altitude measuring unit 210 may detect an altitude again and reset a tracking algorithm. Thereafter, the aforementioned steps may be performed again to perform jamming suppression.

As described above, according to embodiments of the present disclosure, when an altitude is measured, different jamming suppression algorithms are actively utilized according to altitudes, whereby the jamming suppression apparatus resistant to a jamming phenomenon that occurs in measuring an altitude may be provided.

Also, since jamming suppression is preferentially performed before an altitude is measured, accuracy and reliability of altitude measurement may be enhanced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A jamming suppression apparatus of an altitude measuring sensor, the jamming suppression apparatus comprising:
   a signal unit configured to transmit a radio frequency (RF) signal to the outside or receive an RF signal from the outside; and
   a processing unit configured to determine whether jamming has occurred on the basis of a noise signal received from the signal unit, and suppress jamming by performing at least one of a plurality of jamming suppression algorithms sequentially or simultaneously on the basis of a current altitude when jamming has occurred according to the determination result,
   wherein the signal unit samples the noise signal received from the signal unit to detect the number of points exceeding a preset threshold value in a time domain, and when the detected number of points is equal to or greater than a preset number, the processing unit determines that jamming has occurred.

2. The jamming suppression apparatus of claim 1, wherein the processing unit determines a tracking parameter related to the signal unit on the basis of the current altitude detected by the altitude measuring sensor, controls the signal unit on the basis of the determined tracking parameter, and subsequently receives a noise signal from the signal unit.

3. A jamming suppression apparatus of an altitude measuring sensor, the jamming suppression apparatus comprising:
 a signal unit configured to transmit a radio frequency (RF) signal to the outside or receive an RF signal from the outside; and
 a processing unit configured to determine whether jamming has occurred on the basis of a noise signal received from the signal unit, and suppress jamming by performing at least one of a plurality of jamming suppression algorithms sequentially or simultaneously on the basis of a current altitude when jamming has occurred according to the determination result, and
 wherein the processing unit detects a specific altitude section to which the current altitude belongs from a plurality of preset altitude sections, and performs at least one jamming suppression algorithm matched to the specific altitude section.

4. The jamming suppression apparatus of claim 1, wherein,
 after the jamming suppression algorithm is performed, the processing unit receives a noise signal again from the signal unit and determines whether jamming has occurred on the basis of the re-received noise signal, and
 when jamming has not occurred according to the determination result, the processing unit controls the signal unit to track an altitude.

5. The jamming suppression apparatus of claim 4, further comprising:
 an output unit configured to output an altitude,
 wherein, after the jamming suppression algorithm is performed, the processing unit determines validity of the altitude tracked through the signal unit, and
 when the tracked altitude is valid according to the determination result, the processing unit outputs the tracked altitude to the output unit.

6. The jamming suppression apparatus of claim 5, wherein when the tracked altitude is not valid according to the determination result, the processing unit detects a current altitude again using the signal unit.

7. The jamming suppression apparatus of claim 5, wherein the processing unit measures altitudes at least two times during a frequency modulation period of the altitude measuring sensor, and determines validity of the tracked altitudes using an average value of the tracked altitudes.

8. The jamming suppression apparatus of claim 1, wherein the plurality of jamming suppression algorithms include a first algorithm for performing jamming suppression through control in a time domain, a second algorithm for performing jamming suppression by controlling a transmission output and a reception gain value of the signal unit, and a third algorithm for performing jamming suppression using a frequency hop.

9. The jamming suppression apparatus of claim 8, wherein the first algorithm removes the jamming signal by substituting a corresponding value with a signal value "0" regarding a jamming signal occurrence section in the time domain.

10. A jamming suppression method of an altitude measuring sensor, the jamming suppression method comprising:
 detecting an altitude;
 determining a tracking parameter related to a signal unit according to the detected altitude;
 receiving a noise signal from the outside through the signal unit controlled according to the determined tracking algorithm;
 determining whether jamming has occurred on the basis of the noise signal;
 when jamming has occurred according to the determination result, suppressing the jamming using at least one jamming suppression algorithm matched to the detected altitude, among a plurality of preset jamming suppression algorithms; and
 tracking an altitude after the jamming is suppressed,
 wherein, in the determining of whether jamming has occurred, the number of points exceeding a preset threshold value in a time domain is detected by sampling the noise signal, and
 when the detected number of points is equal to or greater than a preset number, it is determined that jamming has occurred.

11. The jamming suppression method of claim 10, wherein,
 in the suppressing of jamming,
 a specific altitude section to which the detected altitude belongs is detected from a plurality of preset altitude sections, and
 the at least one jamming suppression algorithm is performed on the basis of the specific altitude section.

12. The jamming suppression method of claim 10, further comprising:
 after the at least one jamming suppression algorithm is performed, receiving a noise signal from the signal unit again to determine whether jamming has occurred; and
 when jamming has not occurred according to the determination result, tracking an altitude.

13. The jamming suppression method of claim 10, further comprising:
 after the at least one jamming suppression algorithm is performed, determining validity of the altitude tracked through the signal unit; and
 when the tracked altitude is valid according to the determination result, outputting the tracked altitude to an output unit.

14. The jamming suppression method of claim 13, wherein, when the tracked altitude is not valid according to the determination result, a current altitude is detected again using the signal unit.

15. The jamming suppression method of claim 12, wherein,
 in the determining of whether the altitude is valid, altitudes are measured at least twice during a frequency modulation period of the altitude measuring sensor, and validity of the tracked altitudes is determined using an average of the measured altitudes.

* * * * *